(12) United States Patent
Yoshida et al.

(10) Patent No.: US 12,265,314 B2
(45) Date of Patent: Apr. 1, 2025

(54) WATERPROOF CAMERA SYSTEM AND WATERPROOF CASING

(71) Applicant: CANON KABUSHIKI KAISHA, Tokyo (JP)

(72) Inventors: Takashi Yoshida, Kanagawa (JP); Hidetoshi Kei, Tokyo (JP); Masayoshi Shibata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 18/167,118

(22) Filed: Feb. 10, 2023

(65) Prior Publication Data

US 2023/0266642 A1 Aug. 24, 2023

(30) Foreign Application Priority Data

Feb. 18, 2022 (JP) .................. 2022-023861

(51) Int. Cl.
*G03B 17/08* (2021.01)
*H04N 23/66* (2023.01)
*B63B 22/00* (2006.01)

(52) U.S. Cl.
CPC ............. *G03B 17/08* (2013.01); *H04N 23/66* (2023.01); *B63B 22/00* (2013.01)

(58) Field of Classification Search
CPC .. G03B 17/08; G08B 13/19617–19632; G02B 23/22
See application file for complete search history.

(56) References Cited

U.S. PATENT DOCUMENTS 9,366,945 B2 * 6/2016 Kanai ...................... H01Q 1/34

FOREIGN PATENT DOCUMENTS

JP          2000299805 A   * 10/2000
JP          2003-037755 A    2/2003

* cited by examiner

*Primary Examiner* — Leon W Rhodes, Jr.
(74) *Attorney, Agent, or Firm* — Cowan, Liebowitz & Latman, P.C.

(57) ABSTRACT

A waterproof camera system that can easily perform underwater image pickup and overwater image pickup. The waterproof camera system includes an image pickup apparatus, a waterproof casing that hermetically stores the image pickup apparatus. The image pickup apparatus includes a first housing that includes a lens unit and a second housing that holds the first housing. The waterproof casing includes a first section that surrounds a circumference of the first housing and a second section that surrounds a circumference of the second housing. The waterproof camera system has buoyancy that floats the waterproof camera system on a water surface in both a first posture in which the first section of the waterproof casing is in an underwater side and a second posture in which the first section is in an overwater side in a state where the image pickup apparatus is stored.

9 Claims, 7 Drawing Sheets

WATERPROOF CAMERA SYSTEM AND WATERPROOF CASING

FIELD OF THE INVENTION

The present invention relates to a waterproof camera system and a waterproof casing.

DESCRIPTION OF THE RELATED ART

A waterproof camera system, which is constituted by storing an image pickup apparatus like a digital camera into a dedicated waterproof casing, is used for underwater image pickup and overwater image pickup. Overwater image pickup can be performed by attaching a waterproof camera system on a member having buoyancy, such as a float and a surfboard, and by floating it on a water surface so that an image pickup apparatus will be located above a water surface.

Moreover, an underwater supervisory system that is constituted by attaching a float member to a waterproof camera system, that floats on a water surface so that an image pickup apparatus will sink to an underwater side, and that performs underwater image pickup while controlling the image pickup apparatus remotely by wireless communication is proposed (see Japanese Laid-Open Patent Publication (Kokai) No. 2003-37755 (JP 2003-37755A)). Radio waves of 4G, 5G, Wi-Fi (registered trademark), etc. cannot propagate underwater. Accordingly, the underwater supervisory system of the above-mentioned publication enables wireless communication between an external apparatus and the image pickup apparatus by projecting a communication antenna of the image pickup apparatus to the overwater from the float member.

The technique described in the above-mentioned publication is constituted as a system only for the underwater image pickup and does not consider a usage of the overwater image pickup in a floating state on the water surface. In a conventional technique, when the underwater image pickup is switched to the overwater image pickup while floating a waterproof camera system on a water surface, time is needed to exchange a float member that floats the waterproof camera system on the water surface. Accordingly, a waterproof camera system that can perform the underwater image pickup and overwater image pickup easily is required.

SUMMARY OF THE INVENTION

The present invention provides a waterproof camera system that can easily perform underwater image pickup and overwater image pickup.

Accordingly, an aspect of the present invention provides a waterproof camera system including an image pickup apparatus including a first housing that includes a lens unit, and a second housing that holds the first housing, and a waterproof casing that hermetically stores the image pickup apparatus, the waterproof casing including a first section that surrounds a circumference of the first housing, and a second section that surrounds a circumference of the second housing, wherein the waterproof camera system has buoyancy that floats the waterproof camera system on a water surface in both a first posture in which the first section of the waterproof casing is in an underwater side and a second posture in which the first section is in an overwater side in a state where the image pickup apparatus is stored.

According to the present invention, the waterproof camera system that can easily perform underwater image pickup and overwater image pickup is provided.

Further features of the present invention will become apparent from the following description of exemplary embodiments with reference to the attached drawings.

DESCRIPTION OF THE EMBODIMENTS

Figure 1A:
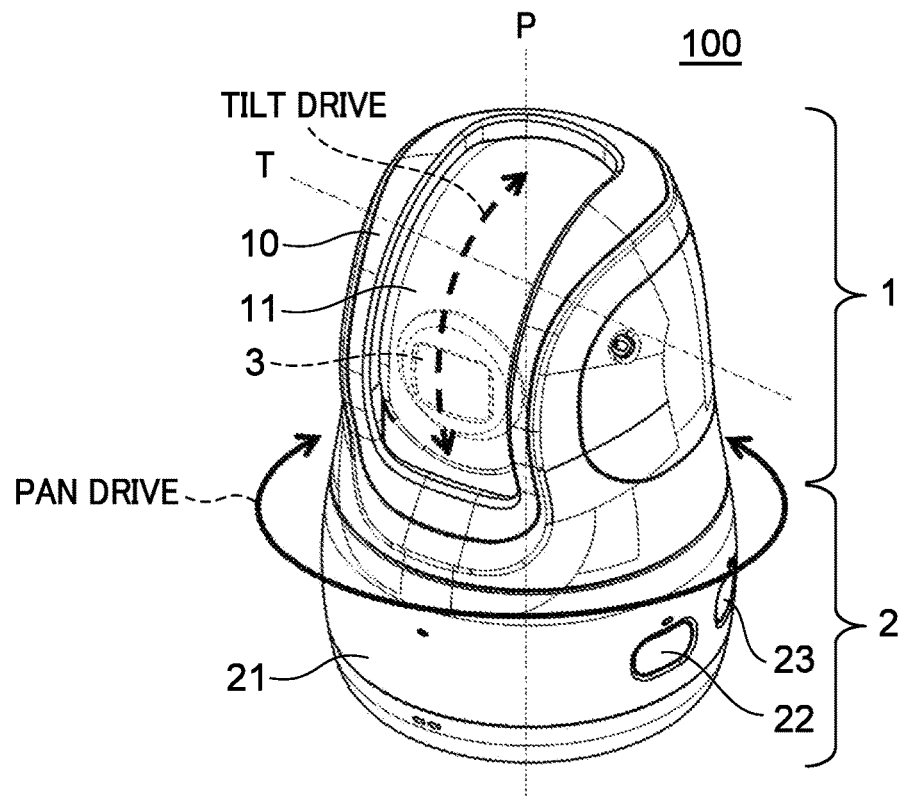
FIG. 1A and FIG. 1B are external perspective views showing a digital camera used for a waterproof camera system.
Figure 1B:
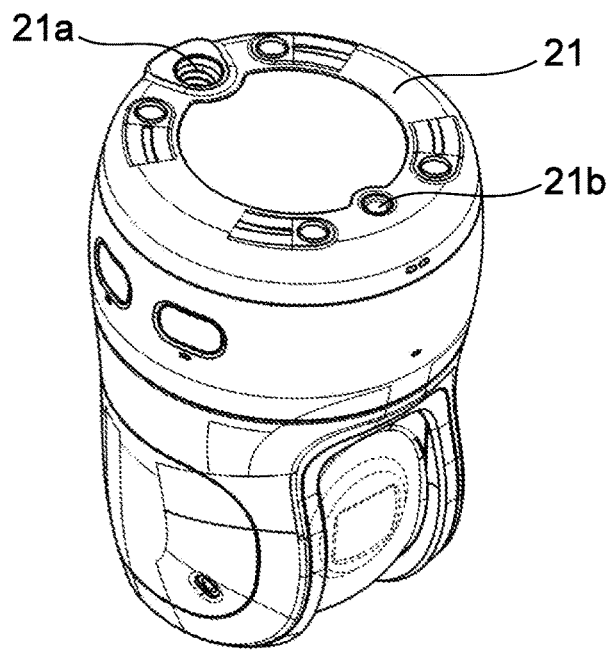

Hereafter, embodiments according to the present invention will be described in detail by referring to the drawings. FIG. 1A and FIG. 1B are external perspective views showing a digital camera 100 as an example of an image pickup apparatus used for a waterproof camera system 1000 according to the embodiment. Directions of viewing the digital camera 100 differ between FIG. 1A and FIG. 1B. It should be noted that the entire configuration of the waterproof camera system 1000 is shown in FIG. 3, FIG. 5, FIG. 6A, and FIG. 6B mentioned later.

The digital camera 100 schematically consists of a first housing 1 and a second housing 2. The first housing 1 has a top cover 10 that covers a front part and an upper part of the first housing 1. The top cover 10 has a dome component 11 that has transparency. The dome component 11 is formed from high transparency resin material, such as polycarbonate resin or acrylic resin, for example. In this embodiment, the acrylic resin that has high transparency for visible light is used.

Inside the dome component 11, a lens unit 3 indicated by a broken line is rotatably held in the first housing 1 so as to enable tilt drive (vertical rotation) around a tilt drive rotation axis T. The lens unit 3 constitutes an image pickup optical system that forms an optical image on an image sensor (not shown) arranged inside the first housing 1.

The second housing 2 is a base part of the digital camera 100 and rotatably holds the first housing 1 so as to enable pan drive (horizontal rotation) around a pan drive rotation axis P. In this way, the digital camera 100 can pick up images in various directions while moving the lens unit 3 by combining the pan drive and tilt drive, even if the digital camera 100 is arranged at a fixed point.

The second housing 2 has a bottom cover 21 as an exterior part. Inside the bottom cover 21, a camera control substrate (not shown), a camera drive battery (not shown), and a wireless module 150 (see FIG. 6A, FIG. 6B, and FIG. 7) are arranged. A power button 22 and a wireless communication button 23 are provided in a side surface of the bottom cover 21. In a bottom surface of the bottom cover 21, a fixing internal thread hole 21a to which a camera fixing external screw 204 (see FIG. 2B) of a waterproof casing 200 (see FIG. 2A) is fastened and a positioning hole 21b used for positioning to the waterproof casing 200 are provided.

Figure 2A:
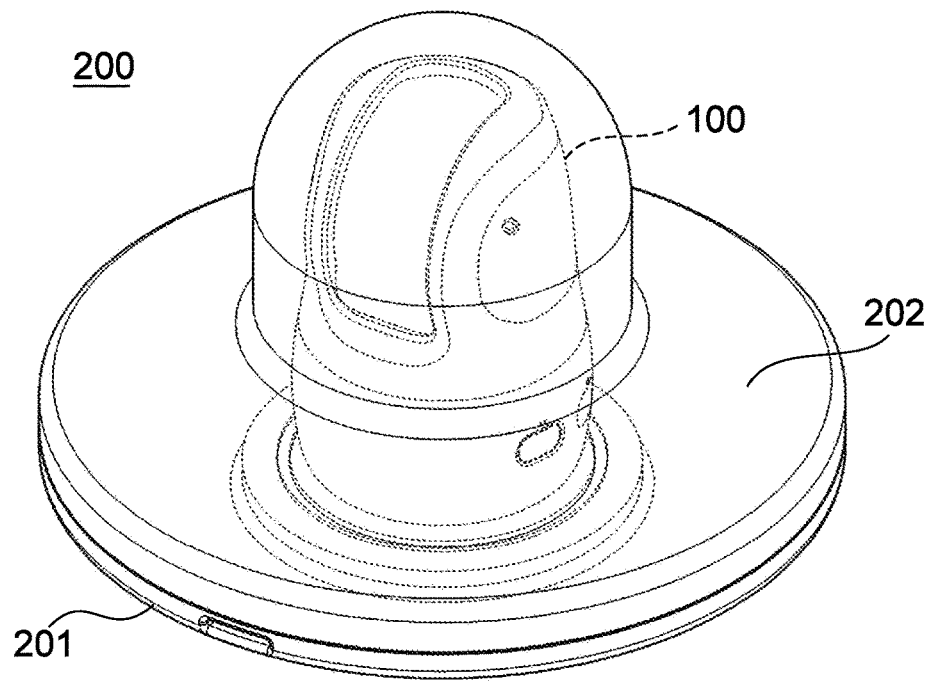
FIG. 2A and FIG. 2B are external perspective views showing a waterproof casing used for the waterproof camera system.
Figure 2B:
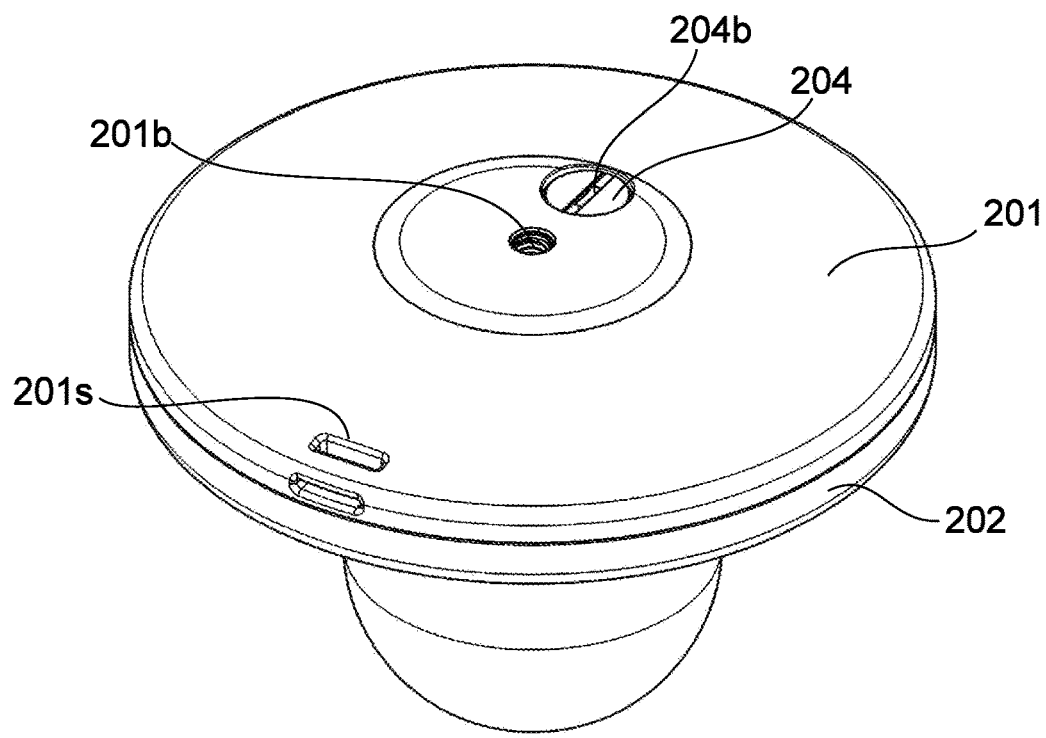

FIG. 2A and FIG. 2B are external perspective views showing the waterproof casing 200 used for the waterproof camera system 1000 according to the embodiment. Directions of viewing the waterproof casing 200 differ between FIG. 2A and FIG. 2B. It should be noted that FIG. 2A shows a state where the digital camera 100 is stored in the waterproof casing 200.

The waterproof casing 200 is mainly constituted by a bottom casing 201 and a top casing 202. The digital camera 100 is fixed to the bottom casing 201. A strap string stopper 201s and a tripod internal thread hole 201b are provided in the bottom casing 201. And the camera fixing external screw 204 can be attached to the bottom casing 201.

A strap string (not shown) can be attached to the strap string stopper 201s. The strap string works as a flow stopper of the waterproof camera system when the waterproof camera system is used floating on a water surface. The tripod internal thread hole 201b is used to fix the waterproof casing 200 to a tripod mount (not shown). A linear groove 204b is formed in the camera fixing external screw 204 that is screwed to the fixing internal thread hole 21a so as to enable thread fastening with a coin etc. The top casing 202 is formed from polycarbonate resin that has a high transparency.

Figure 3:
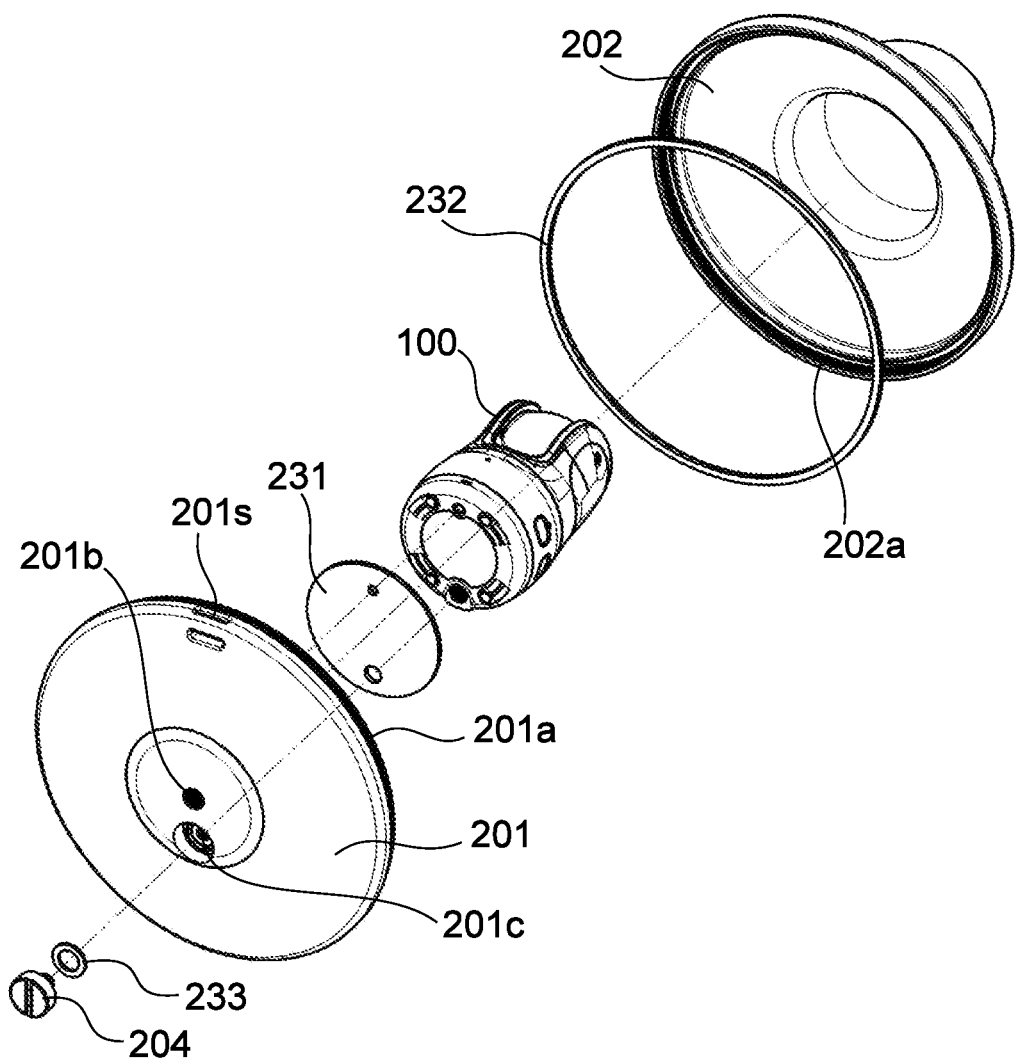
FIG. 3 is an exploded perspective view showing the waterproof camera system.

FIG. 3 is an exploded perspective view of the waterproof camera system 1000. The digital camera 100 is shown without decomposing. The digital camera 100 is fixed to the bottom casing 201 of the waterproof casing 200 by the camera fixing external screw 204. Details of a positioning method and a fixing method between the digital camera 100 and the bottom casing 201 will be mentioned later by referring to FIG. 4.

A rubber sheet 231 as a shock absorbing member that has elasticity is arranged between the digital camera 100 and the bottom casing 201. The rubber sheet 231 is fixed to the bottom casing 201 by using a double-stick tape (not shown) and suppresses impact and vibration transmitted to the digital camera 100 by absorbing impact and vibration applied to the waterproof casing 200 from the outside. It should be noted that the rubber sheet 231 may be fixed by using adhesive.

An internal thread 202a is formed in an inner side of the top casing 202 at its open side. An external thread 201a that screws to the internal thread 202a is formed in the bottom casing 201. The top casing 202 and the bottom casing 201 are connected by screwing the internal thread 202a with the external thread 201a.

Invasion of water from the screwed part between the bottom casing 201 and the top casing 202 is prevented by an O-ring 232 formed from silicone rubber etc. The O-ring 232 is fixed to an O-ring fixed part 202b (see FIG. 6A) of the top casing 202 and prevents invasion of water to the inside by elastic compression to an O-ring contact part 201f (see FIG. 4 and FIG. 6A) of the bottom casing 201.

In this way, since the external thread 201a of the bottom casing 201 is screwed with the internal thread 202a of the top casing 202 and the screwed part is waterproofed by the O-ring 232, the waterproof casing 200 allows an easy opening and closing operation while keeping the waterproof function.

The invasion of water to the inside of the waterproof casing 200 through a hole 201c formed in the bottom casing 201 is prevented by arranging an O-ring 233 formed from silicone rubber etc. between the camera fixing external screw 204 and the bottom casing 201. In this way, the digital camera 100 is hermetically stored in the waterproof casing 200 airtightly. It should be noted that an internal thread is formed in the hole 201c of the bottom casing 201 so that the camera fixing external screw 204 may not drop from the bottom casing 201 easily even in a state where the digital camera 100 is detached from the bottom casing 201.

Figure 4:
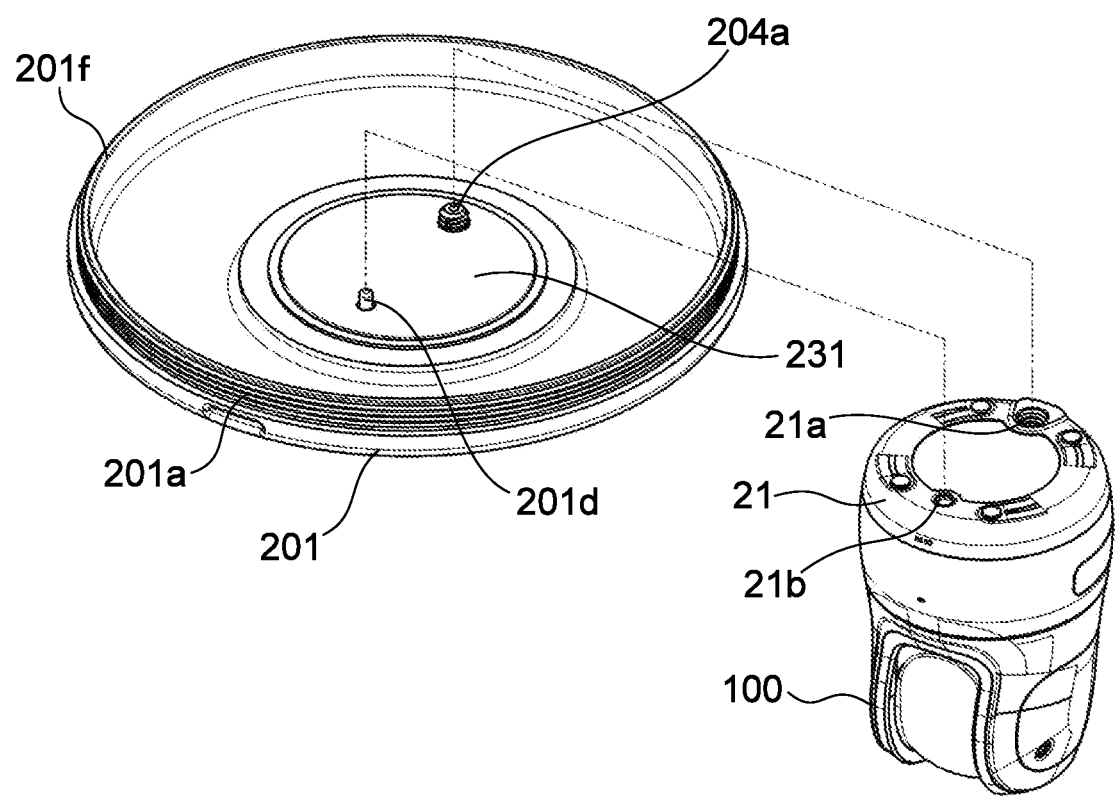
FIG. 4 is a perspective view describing a fixing method of the digital camera to the waterproof casing.

FIG. 4 is a perspective view describing the fixing method of the digital camera 100 to the bottom casing 201 of the waterproof casing 200. A positioning boss 201d of the bottom casing 201 is fitted into the positioning hole 21b of the digital camera 100, and the external thread 204a of the camera fixing external screw 204 is screwed to the fixing internal thread hole 21a of the digital camera 100.

Thereby, the digital camera 100 is positioned to the bottom casing 201 of the waterproof casing 200 and is fixed in contact with the bottom casing 201 through the rubber sheet 231. As a result, positional relationships between the components of the digital camera 100 and the components of the waterproof casing 200 are settled.

Figure 5:
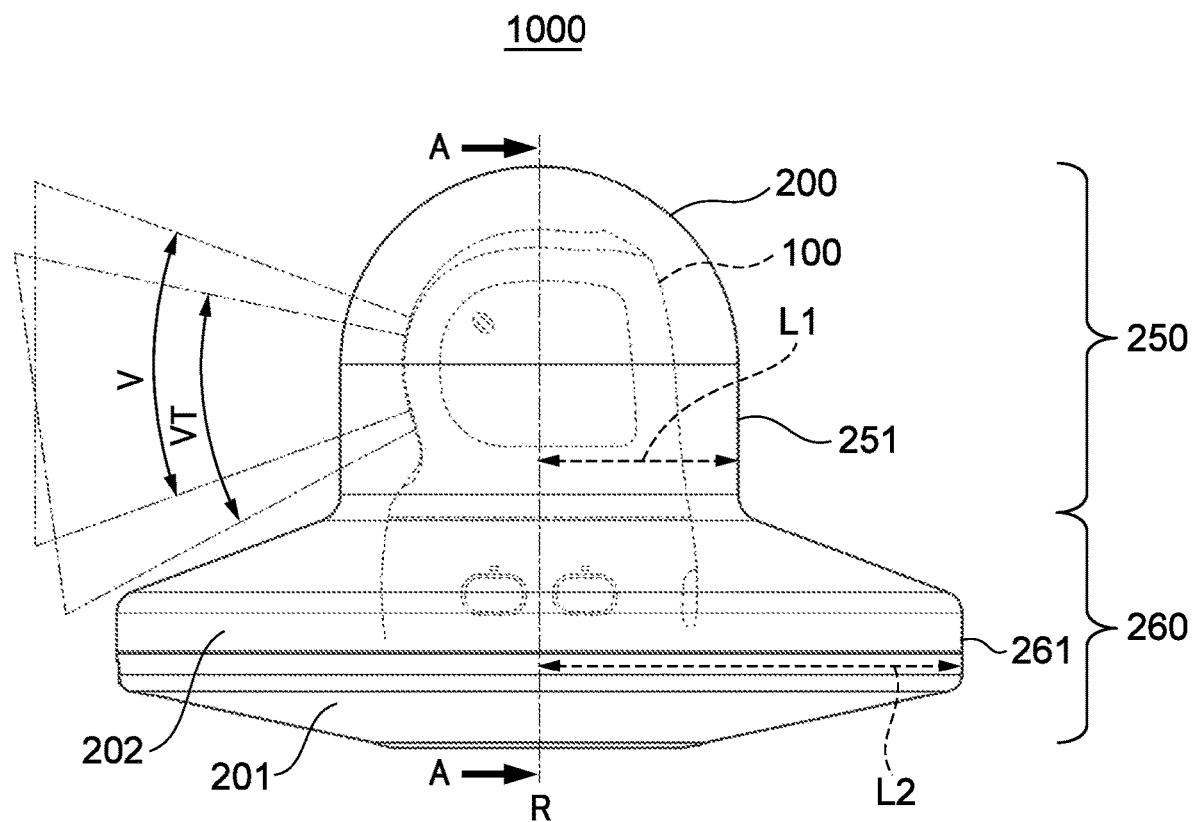
FIG. 5 is a side view showing the waterproof camera system.
Figure 6A:
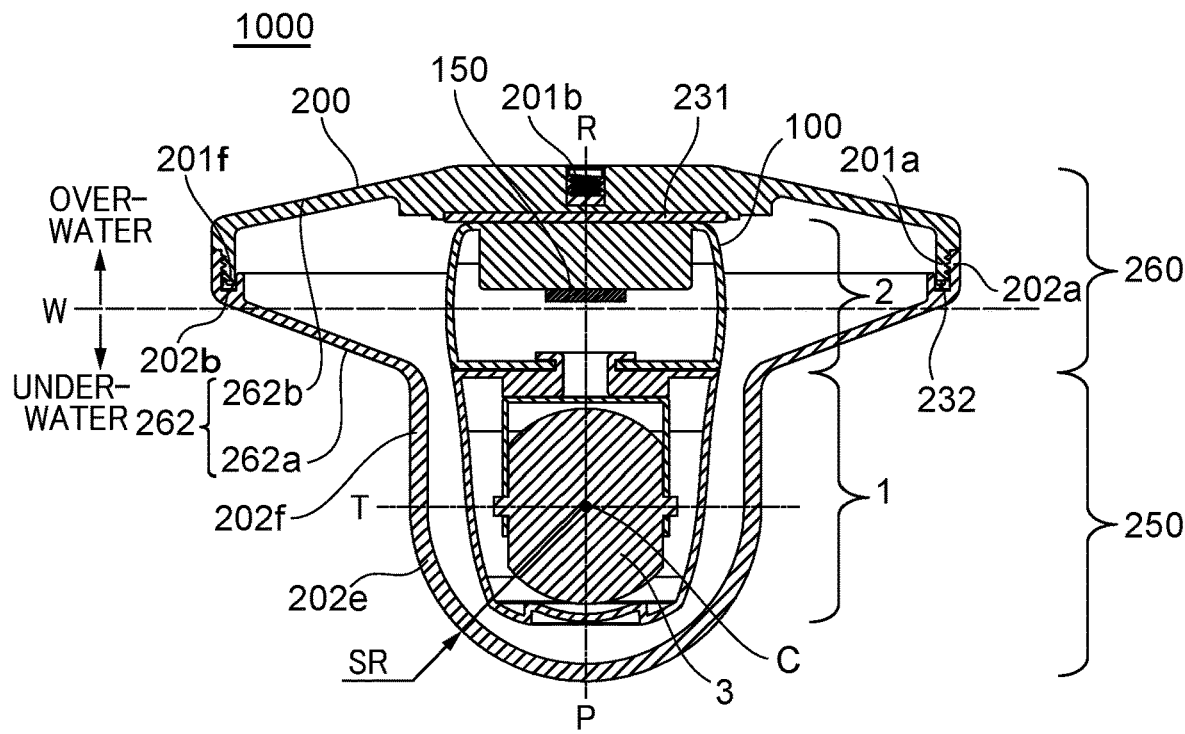
FIG. 6A and FIG. 6B are sectional views showing states where the waterproof camera system floats on a water surface.
Figure 6B:
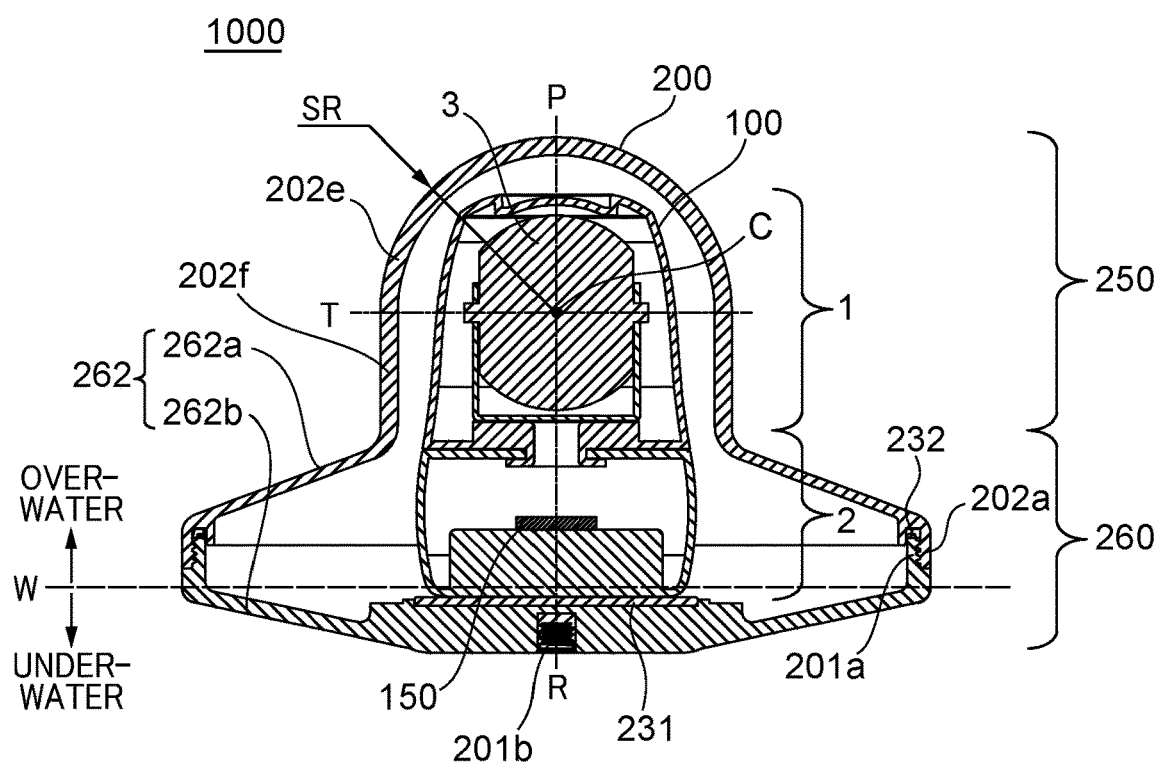
Figure 7:
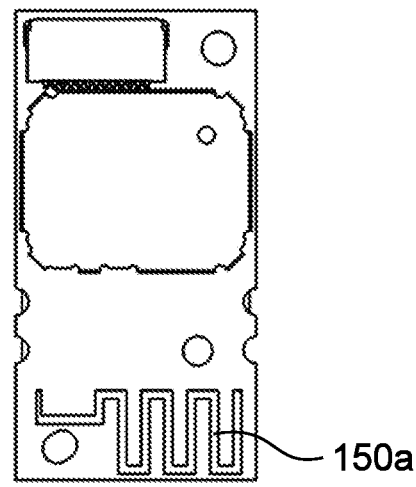
FIG. 7 is a front view showing a wireless module installed in the digital camera.

Next, a shape characteristic of the waterproof casing 200 and a state where the waterproof camera system 1000 is floated on a water surface will be described. FIG. 5 is a side view showing the waterproof camera system 1000. FIG. 6A and FIG. 6B are sectional views showing states where the waterproof camera system 1000 floats on the water surface. FIG. 7 is a front view showing the wireless module 150 installed in the digital camera 100.

FIG. 6A shows an underwater image pickup state in which the lens unit 3 is located at the underwater side, and FIG. 6B shows an overwater image pickup state in which the lens unit 3 is located at the overwater side. Moreover, the section in FIG. 6A and FIG. 6B is taken along an arrow A-A shown in FIG. 5 and includes the pan drive rotation axis P and tilt drive rotation axis T of the digital camera 100. Moreover, FIG. 6A and FIG. 6B do not show parts unnecessary to the following description.

As mentioned above, the waterproof casing 200 consists of the bottom casing 201 and the top casing 202. The waterproof casing 200 has a shape of an approximately rotating body around a center axis R as a whole (a cubic shape formed by a locus formed by rotating the section in FIG. 6A around the center axis R). In the waterproof camera system 1000 (i.e., in the state where the digital camera 100 is hermetically stored in the waterproof casing 200), the center axis R of the waterproof casing 200 approximately agrees with the pan drive rotation axis P of the digital camera 100.

The waterproof casing 200 mainly consists of a first section 250 and a second section 260. As shown in FIG. 5, the first section 250 is constituted by a part of the top casing 202, and the second section 260 is constituted by the bottom casing 201 and the other part of the top casing 202. In general, the first section 250 encloses the circumference of the first housing 1, and the second section 260 encloses the circumference of the second housing 2.

A distance L2 from an outermost part 261 of the second section 260 to the center axis R is larger than a distance L1 from an outermost part 251 of the first section 250 of the waterproof casing 200 to the center axis R (L2>L1). In other words, the first section 250 of the waterproof casing 200 has a shape that encloses the outer circumferential surface of the first housing 1 of the digital camera 100 with a space of an almost equal distance.

In the meantime, the second section 260 has a shape that gradually separates from the outer circumference of the second housing 2 of the digital camera 100 from a border with the first section 250. In this way, the waterproof casing 200 has a large space in the second section 260.

That is, the waterproof casing 200 has predetermined buoyancy in the second section 260 and keeps a stable floating state near the water surface W without using a float member in both a first posture in which the first section 250 surrounding the lens unit 3 is in the underwater side and a second posture in which the first section 250 surrounding the lens unit 3 is in the overwater side. Accordingly, the underwater image pickup and the overwater image pickup are stably performed.

As shown in FIG. 5, the waterproof camera system 1000 is designed so that the second section 260 is not reflected into an image even when the digital camera 100 is maximally tilt-driven downward (toward the second section 260) and an image-pickup field angle V becomes VT. That is, the waterproof camera system 1000 is designed so that the second section 260 does not enter into the image-pickup field angle that can be set up in the digital camera 100. Accordingly, an image can be picked up without reflecting the waterproof casing 200 into the image-pickup field angle when the lens unit 3 of the digital camera 100 is tilt-driven in any of the overwater image pickup state and the underwater image pickup state.

The second section 260 has a first inclination part 262a that gradually separates from the outer circumference of the second housing 2 (from the center axis R, in other words) from the border with the first section 250.

Moreover, the second section 260 has a second inclination part 262b that gradually approaches to the outer circumference of the second housing 2 (to the center axis R, in other words) towards the base of the bottom casing 201 from the outermost part 261. The first inclination part 262a faces the second inclination part 262b across a plane that intersects perpendicularly with the center axis R.

The first inclination part 262a becomes the underwater side in the underwater image pickup state, and the second inclination part 262b becomes the underwater side in the overwater image pickup state, so that influence of a shake of the water surface W is reduced. In this way, since the waterproof camera system 1000 stably floats on the water surface W, a shake in picking up an image is reduced.

Moreover, the first inclination part 262a is designed so as to enlarge a volume of an inside space of the second section 260 within a range that does not overlap with the image-pickup field angle VT in tilt-driving the lens unit 3 of the digital camera 100 toward the second section 260 at the maximum. In this way, since the waterproof casing 200 has an inclination part 262 that consists of the first inclination part 262a and second inclination part 262b, the internal volume of the second section 260 increases and air is held therein, which obtains a large buoyancy.

The wireless module 150 that is installed inside the second housing 2 has an antenna unit 150a, an IC (not shown), and a connector (not shown) that are implemented on a wireless module substrate as shown in FIG. 7. The digital camera 100 can perform wireless communication with an external device through the antenna unit 150a. Although an antenna integrated module of which the antenna unit 150a is formed on the wireless module substrate is used as the wireless module 150 in the embodiment, this is not indispensable. The antenna unit 150a may be separated.

If the antenna unit 150a is located under the water surface in using the waterproof camera system 1000, a radio wave will become difficult to reach the antenna unit 150a. Accordingly, in order to suppress occurrence of communication shutdown due to water in both the underwater image pickup and overwater image pickup, it is preferable to locate the antenna unit 150a above the water surface or near the water surface in both the underwater image pickup and overwater image pickup.

The buoyancy needed for the waterproof casing 200 in order to locate the antenna unit 150a above the water surface or near the water surface is designed in consideration of the weight of the digital camera 100 contained and the implementation position of the antenna unit 150a. Thereby, an image pickup operation, a setting operation of an image pickup condition, and live view display of a pickup image, in the digital camera 100, and reproduction of a pickup image stored in the digital camera 100 can be performed by the external device in a stress free state.

As mentioned above, the pan drive rotation axis P of the digital camera 100 approximately agrees with the center axis R of the waterproof casing 200 (they are located on an approximately same straight line, in other words). Since the distance between the lens unit 3 of the digital camera 100 and the top casing 202 of the waterproof casing 200 is thereby kept constant even when the digital camera 100 is pan-driven, occurrence of distortion in a pickup image resulting from the top casing 202 can be suppressed.

Moreover, a part of the first section 250 of the waterproof casing 200 forms a hemispherical part 202e of a radius SR around a point C, as shown in FIG. 6. Then, the point C is located on the intersection of the pan drive rotation axis P and tilt drive rotation axis T, and is located on an image-pickup optical axis of the lens unit 3.

Thereby, even when the digital camera 100 is pan-driven, and even when the lens unit 3 is tilt-driven, the distance between the lens unit 3 of the digital camera 100 and the top casing 202 of the waterproof casing 200 is kept constant. Accordingly, occurrence of distortion in a pickup image resulting from the top casing 202 can be suppressed.

Moreover, the first section 250 has a cylindrical part 202f formed adjacent to the hemispherical part 202e. The reason why the first section 250 is formed so that the cylindrical part 202f is formed adjacent to the hemispherical part 202e is because the top casing 202 abolishes an undercut in consideration of an extracting direction of a mold when the inner shape of the top casing 202 is formed by resin mold.

As mentioned above, the underwater image pickup and the overwater image pickup can be performed easily without using a float member according to this embodiment. Moreover, since shutdown of wireless communication with an external device due to water is avoidable, various operations to the digital camera from the external device and transmission of image data etc. from the digital camera to the external device can be performed in a stress free state.

Although the present invention has been described in detail on the basis of the suitable embodiments, the present invention is not limited to these specific embodiments, and various configurations that do not deviate from the scope of the present invention are also included in the present invention.

For example, in the above-mentioned embodiment, the waterproof camera system is constituted by storing the digital camera having the lens unit that enables the pan drive and tilt drive in the waterproof casing. In the meantime, a digital camera that can be stored in the waterproof casing is not restricted to the above-mentioned configuration. For example, a digital camera of which an image pickup direction is invariable (an orientation of a lens unit cannot be changed) may be employed.

Moreover, an image pickup apparatus that can be stored in the waterproof casing is not restricted to a digital camera and may be electronic apparatuses, such as a video camera and a smart phone that have an image pickup function (an image sensor). Although the waterproof casing configured by screwing the top casing to the bottom casing and by interposing the O-ring to seal is described in the embodiment, this is not indispensable. A waterproof casing may be configured by using a patching lock etc. to seal and by interposing the O-ring.

Furthermore, although the waterproof casing is constituted from the top casing and bottom casing that are screwed at the outermost part of the second section in the above-mentioned embodiment, a screwing position of the two casings is not restricted to this position. Moreover, the waterproof casing is not necessarily constituted from the two casings that are the tip casing and bottom casing. The waterproof casing may be constituted from three or more casings in consideration of the shape of the image pickup apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023861, filed Feb. 18, 2022, which is hereby incorporated by reference herein in its entirety.

What is claimed is:

1. A waterproof camera system comprising:
an image pickup apparatus comprising:
a first housing that includes a lens unit; and
a second housing that holds the first housing; and
a waterproof casing that hermetically stores the image pickup apparatus, the waterproof casing comprising:
a first section that surrounds a circumference of the first housing; and
a second section that surrounds a circumference of the second housing,
wherein the waterproof casing has buoyancy that, in a state where the waterproof casing stores the image pickup apparatus, floats the waterproof camera system on a water surface in both a first posture in which the first section of the waterproof casing is in an underwater side and a second posture in which the first section is in an overwater side,
wherein the waterproof casing has a shape of an approximately rotating body having a center axis,
wherein the first housing is held by the second housing rotatably around a pan drive rotation axis that is located on an approximately same straight line as the center axis,
wherein the lens unit is held by the first housing rotatably around a tilt drive rotation axis that intersects perpendicularly with the pan drive rotation axis,
wherein the second section comprises
a first inclination part extending from a boundary between the first section and the second section toward an outermost part of the second section while gradually separating from an outer circumference of the second housing of the image pickup apparatus, and
a second inclination part extending from the outermost part while gradually approaching to the second housing of the image pickup apparatus, and
wherein the first inclination part has a shape that does not enter into an image-pickup field angle of the image pickup apparatus when the lens unit is rotated around the tilt drive rotation axis to a rotation maximum toward the second section.

2. The waterproof camera system according to claim 1, wherein the image pickup apparatus is provided with a wireless module that has an antenna unit, and
wherein the antenna unit is located in one of a position above the water surface and a position near the water surface in any of the first posture and the second posture.

3. The waterproof camera system according to claim 1, wherein a part of the first section forms a hemispherical part, and
wherein a center of the hemispherical part is located at an intersection of the pan drive rotation axis and the tilt drive rotation axis, and is located on an image-pickup optical axis of the lens unit.

4. The waterproof camera system according to claim 1, wherein the second section has a shape that does not enter into an image-pickup field angle that can be set up in the image pickup apparatus.

5. A waterproof casing that hermetically stores an image pickup apparatus having a first housing that includes a lens unit and a second housing that holds the first housing, the waterproof casing comprising:
a first section that surrounds a circumference of the first housing; and
a second section that surrounds a circumference of the second housing,
wherein the waterproof casing has buoyancy that floats the waterproof casing on a water surface in a state where the waterproof casing hermetically stores the image pickup apparatus, in both a first posture in which the first section is in an underwater side and a second posture in which the first section is in an overwater side in,
wherein the second section comprises
a first inclination part extending from a boundary between the first section and the second section toward an outermost part of the second section while gradually separating from an outer circumference of the second housing of the image pickup apparatus, and
a second inclination part extending from the outermost part while gradually approaching to the second housing of the image pickup apparatus, and
wherein the first inclination part has a shape that does not enter into an image-pickup field angle of the image pickup apparatus.

6. The waterproof casing according to claim 5, wherein the waterproof casing has a shape of an approximately rotating body having a center axis.

7. The waterproof casing according to claim 6, wherein a distance from the outermost part of the second section to the center axis is larger than a distance from an outermost part of the first section to the center axis.

8. The waterproof casing according to claim 7, wherein:
the first inclination part gradually separates from the center axis towards the outermost part of the second section from the boundary with the first section; and
the second inclination part gradually approaches to the center axis from the outermost part of the second section.

9. The waterproof casing according to claim 5, wherein the waterproof casing consists of two casings that are screwed at the outermost part of the second section.

* * * * *